(12) United States Patent
Shostak

(10) Patent No.: US 7,206,594 B2
(45) Date of Patent: Apr. 17, 2007

(54) WIRELESS COMMUNICATION CHAT ROOM SYSTEM AND METHOD

(75) Inventor: Robert E. Shostak, Portola Valley, CA (US)

(73) Assignee: Vocera Communications, Inc., Cupertino, CA (US)

( * ) Notice: Subject to any disclaimer, the term of this patent is extended or adjusted under 35 U.S.C. 154(b) by 612 days.

(21) Appl. No.: 10/781,438

(22) Filed: Feb. 17, 2004

(65) Prior Publication Data
US 2005/0181815 A1    Aug. 18, 2005

(51) Int. Cl.
*H07B 7/00* (2006.01)
(52) U.S. Cl. ............. 455/519; 455/518; 455/41.2; 455/414.1
(58) Field of Classification Search ......... 455/519, 455/518, 41.2, 414.1, 517, 426.1, 458, 466, 455/459; 370/312, 328, 390; 709/206
See application file for complete search history.

(56) References Cited

U.S. PATENT DOCUMENTS 6,304,558 B1 * 10/2001 Mysore ............... 370/312
2003/0018726 A1 * 1/2003 Low et al. ............. 709/206
2004/0203363 A1 * 10/2004 Carlton et al. ......... 455/41.2
2005/0021645 A1 * 1/2005 Kulkarni et al. ....... 709/206

\* cited by examiner

*Primary Examiner*—Matthew Anderson
*Assistant Examiner*—Tan Trinh
(74) *Attorney, Agent, or Firm*—Timothy W. Lohse; DLA Piper US LLP

(57) ABSTRACT

A chat group system and method are provided that permit a wireless communications system based on an 802.11 protocol to implement an easy-to-use, multi-user, push-to-talk, instant communications functionality. The system maintains a reasonable system latency during the chat session while not excessively increasing the power consumption of the wireless communication devices of the 802.11 communications system. In order to decrease the packet load on the network, the system uses multicast packets to implement the feature wherever possible, with unicast packets required only at the beginning and end of each chat session, not at the beginning or end of each user's transmission.

64 Claims, 6 Drawing Sheets

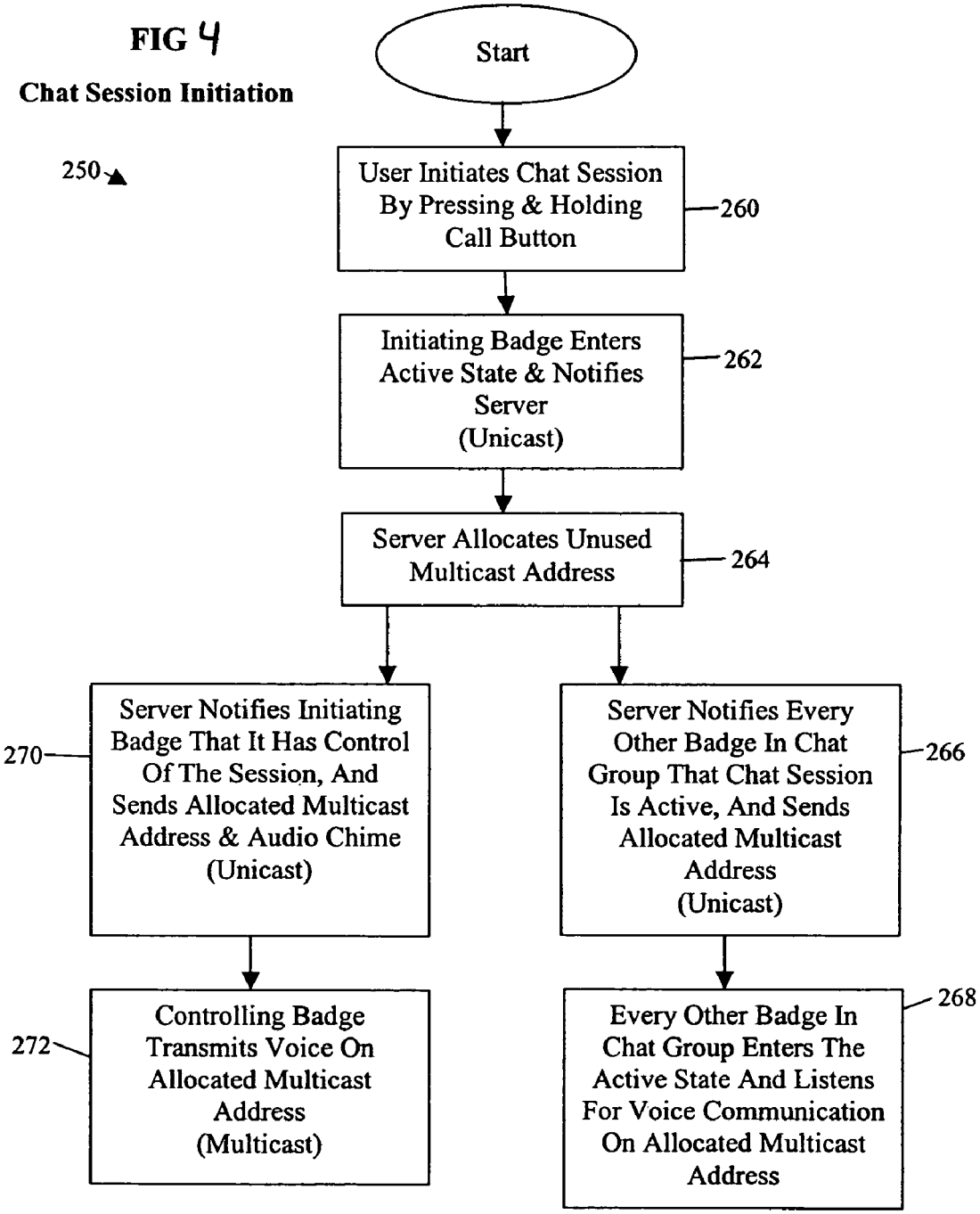

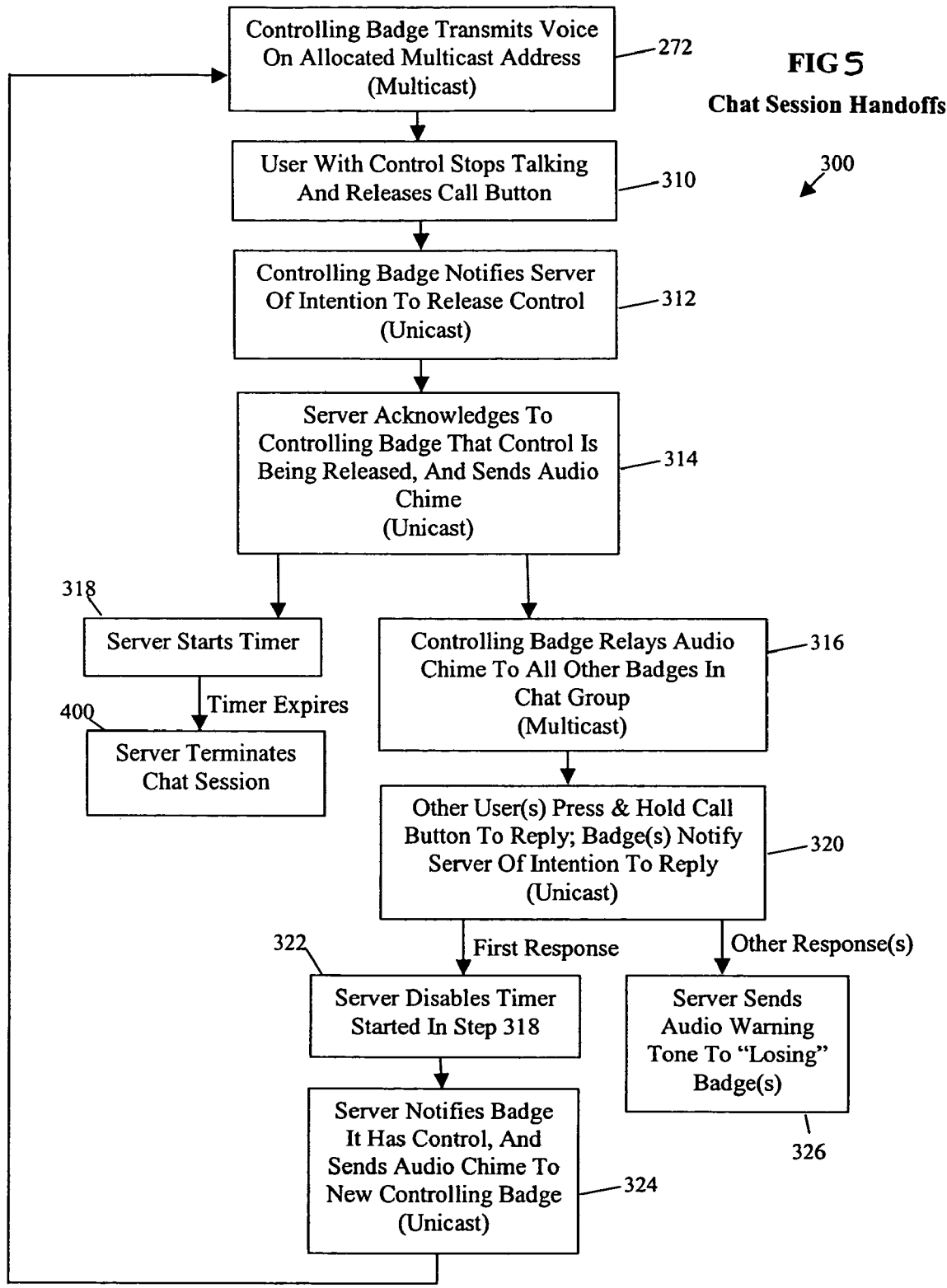

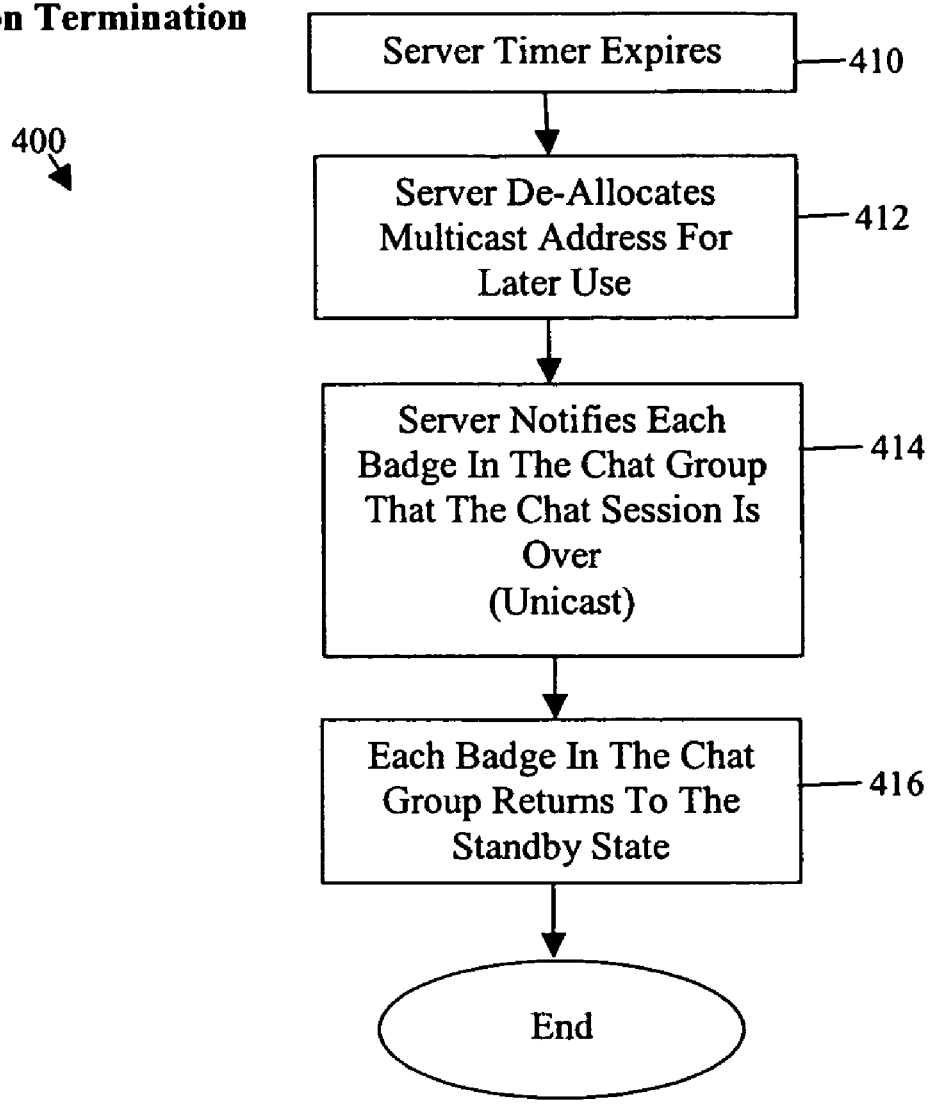

WIRELESS COMMUNICATION CHAT ROOM SYSTEM AND METHOD

FIELD OF THE INVENTION

This invention relates generally to a system and method for providing wireless communications among individuals and in particular to a system and method that adds an easy-to-use, multi-user, "chat" capability to a wireless communications system in which the communication devices communicate with one or more typical wireless computer network access points, which in turn connect to a typical wired computer network.

BACKGROUND OF THE INVENTION

Various different wireless communication devices are well known and form a large part of our everyday lives. Examples of the well known wireless communication devices include walkie-talkies and other simple two-way radios, cellular phones, pagers, and Palm-type handheld devices that permit e-mail or Internet access. Simple two-way radios require no network infrastructure, since each radio communicates directly with each other radio. However, simple two-way radios also offer none of the network-based features people expect of a modern communications system, such as the ability to set up a private connection between two communications devices using an identifier such as a phone number or name. Each of the other examples given of wireless communications devices requires an expensive network infrastructure to operate correctly.

One area where wireless communication devices can play an important role is in the workplace, to allow mobile employees to communicate with one another. Many workplaces have already installed a wireless computer network to support wireless devices such as laptop computers. These wireless computer networks use a standard wireless networking protocol, such as one of the 802.11 standards, and consist of one or more wireless access points, typically installed in the ceiling of a building. The access points communicate with various wireless devices using the selected standard wireless networking protocol, and communicate with each other, and with other computers, over a standard wired computer network, such as Ethernet. Since a full-featured modern communication system requires a network infrastructure to operate correctly, it makes sense to develop a wireless communications system which uses a typical wireless computer network (such as one based on an 802.11 standard) as its network infrastructure. This makes it possible to deploy a wireless communications system without the need to deploy a completely separate parallel wireless network.

A desired feature of a communications system, especially one intended for use in the workplace, is the capability to allow multiple users to talk to each other as a group. Ideally, this feature would be easy to use, offer virtually instant response, and would not require one user to individually contact every other member of the group to initiate a communications session. Some wireless devices, such as walkie-talkies and some cellular phones, provide a feature with some or all of these characteristics. This feature is inherent in the way walkie-talkies operate, since any voice message transmitted by a walkie-talkie is heard by any other walkie-talkies nearby which are tuned to the same frequency channel. When this feature is provided on a communications system which does not use walkie-talkies, it is often patterned on the way walkie-talkies are used. The users place themselves in a special mode, and select which pre-defined group they wish to be a part of (this selection is roughly the equivalent of selecting the frequency channel on a walkie-talkie). Once the mode is activated, transmission of a voice signal to other group members is typically controlled with a single button, with the user pressing the button the entire time they wish to transmit. This type of multi-user communications session, based roughly on the push-to-talk mode found on typical walkie-talkies, will be referred to as a "chat" mode.

There are communications systems on the market which are based on a typical wireless communication network such as one of the 802.11 protocols, but these systems do not typically provide a chat mode. Implementing a chat capability in a voice communications system based on a typical wireless computer network, such as one of the 802.11 protocols, brings up several problems not typically encountered with walkie-talkies. These problems include power consumption, system latency, and a limitation on the rate that communications packets can be efficiently processed by the network.

A typical walkie-talkie does not consume much power while listening for communications. It can therefore be left in a listening mode, with its receiver turned on, the entire time it is being used, with no great penalty paid in battery life. In contrast, a wireless device based on a wireless computer network typically consumes significant power when listening for communications. The state of a typical wireless device intended for use with a wireless computer network is therefore changed whenever incoming communications signals are not expected, with the receiver turned off most of the time to reduce power consumption. This power management has the side effect of adding significant latency to the system when incoming signals actually arrive. It takes time for each device to realize new communications are coming in, and to change its state back to a listening state, with the receiver turned on. This added system latency, if it occurred each time a member of a chat group started transmitting a voice signal, would defeat the intended purpose of the feature, which is to provide easy-to use instant communication between group members.

An additional complicating factor is the network limitation on the rate that communications packets can be processed and delivered by the network. For any system based on a typical computer network, all communications signals will be placed into packets based on the well-known Internet Protocol (IP). The wireless access points and various components of a typical wired computer network must process each of these IP packets separately, and there is a limit to the rate at which packets can be efficiently processed. The standard IP packet is transmitted from one transmitting device to a single receiving device, and is called a unicast packet. If a chat mode communications session involved a large number of users, and each user's device communicated with each other device using unicast packets, the rate of transmitted packets could easily grow too large. Because of this, it is desired that the chat feature be implemented as much as possible using a different type of packet called a multicast packet, which allows one transmitting device to send the same single packet to multiple receiving devices, greatly reducing the total number of packets which must be processed by the network. However, the use of the multicast packet complicates the tradeoff between power consumption and system latency described above, because a device that has changed its state to the low-power state, with its receiver off most of the time, typically ignores multicast packets on the network. Failure to ignore multicast packets can significantly increase power consumption in this low-power state.

Therefore, if optimum power consumption is to be achieved in the low-power state, only a unicast packet can reliably be counted on to reach the device and "wake it up", returning it to the full listening state. Thus, a wireless communication device that is based on a typical wireless computer network, provides a chat capability, resolves the tradeoff between power consumption and latency, and which primarily uses multicast packets to implement the feature without increasing power consumption, is desirable. It is to this end that the present invention is directed.

SUMMARY OF THE INVENTION

The wireless communications system in accordance with the invention provides chat functionality, allowing easy-to-use instant communication among multiple users. To accomplish this, the system simulates the walkie-talkie by providing "push-to-talk" operations. In accordance with the invention, a user with one of the communications devices may be a part of a chat group and may then be able to instantaneously communicate with other members of the chat group. In a preferred embodiment, this is done by pressing and holding the "call" button of a wireless communications system device so that the user does not need to contact each of the members of the chat group separately, and does not need to take extra steps to identify the intended recipient of the communication (i.e. no dialing of a phone number or issuing of a specific voice command is required—only a single button press). In accordance with the invention, the wireless communication system may support a practically unlimited number of separate chat groups wherein each chat group and its current members are stored in a database that is part of the wireless communications system. The system permits multiple simultaneous chat groups to be active wherein each chat group may include different membership. The users within the same chat group may interact with each other using the chat functionality. The set of possible chat groups and their initial membership is pre-defined by the administrator of the communications system, using the system configuration tools available to him/her, but the current membership at any time is dynamically controlled by each user. Each of the users, with a simple voice command issued using the communications device, can join or leave any of the pre-defined chat groups as they wish, although, in a preferred embodiment, each user can belong to only one chat group at any point in time.

In accordance with a preferred embodiment of the invention, the chat method is implemented in which a user may press and hold a call button of his/her badge to initiate a chat session with the members of his or her chat group. The badge will provide some sort of feedback to indicate that the user has control of the chat session. For example, the badge may emit a chime to indicate that the user may begin talking. Once the user begins talking, the other members of the chat group hear the talker. When the talker is finished, he or she releases the call button and then the other members of the chat group hear a sound indicating that the talker has finished, and that another user may now attempt to get control and reply. In the preferred embodiment, if multiple users press their call buttons to attempt to gain control, the first to press is given control, and hears the chime indicating he or she may begin talking, while other users who press their call button hear a warning tone. This warning tone indicates that another user has control and is talking.

To implement the chat functionality in a wireless communications system based on a wireless computer network, such as one that uses an 802.11 protocol, the system must resolve several issues including tradeoffs between power consumption, system latency, and efficient use of multicast packets. The wireless communications system in accordance with the invention does resolve these issues successfully.

In accordance with the invention, a wireless chat group system is provided. The system has a controlling computer having a processor that executes computer instructions, a wireless access point connected to the controlling computer and two or more wireless communication devices each having a processor that executes computer instructions wherein the wireless communication devices communicate with the wireless access point and wherein a first wireless communication device further comprises computer instructions that request a chat session by communicating with the controlling computer through the wireless access point. The controlling computer has a chat group module having a chat group session manager and an address assignment module wherein the address assignment module further comprising computer instructions that assign a multicast internet protocol address to the chat session. The chat group session manager further comprises computer instructions that communicate a wake-up packet with the multicast internet protocol address to the wireless communications devices associated with the chat session and computer instructions that start a timer when the first wireless communication device completes its transmission over the multicast internet protocol address wherein the multicast internet protocol address for the chat session remains assigned to the chat session as long as another transmission over the multicast internet protocol address occurs before the timer times out.

In accordance with another aspect of the invention, a wireless chat group system is provided that has a controlling computer having a processor that executes computer instructions, a wireless access point connected to the controlling computer and two or more wireless communication devices each having a processor that executes computer instructions wherein the wireless communication devices communicate with the wireless access point and wherein a first wireless communication device further comprises computer instructions to request a chat session by generating a unicast packet that is communicated to the controlling computer through the wireless access point. The controlling computer further comprises a chat group module having a chat group session manager and an address assignment module wherein the address assignment module further comprising computer instructions that assign a multicast internet protocol address to the chat session. The chat group session manager further comprises computer instructions that generate a wake-up unicast packet to each wireless communications devices associated with the chat session that communicates the multicast internet protocol address wherein the chat session occurs via multicast packets sent from the first wireless communication device to the other wireless communication devices associated with the chat session.

In accordance with yet another aspect of the invention, a wireless communication device that operates with a wireless chat group system having a controlling computer, a wireless access point connected to the controlling computer and two or more wireless communication devices wherein the wireless communication devices communicate with the wireless access point is provided. The wireless communication device comprises a processor that executes a plurality of computer instructions wherein the computer instructions comprises computer instructions that generate a unicast packet communicated to a computer to request a chat session, computer instructions that receive a wake-up unicast packet from the computer containing the multicast internet protocol address assigned to the chat session in response to the request of the chat session, and computer instructions that communicate with other wireless communication devices in the chat session using multicast packets.

In accordance with yet another aspect of the invention, a method for a chat group session over a wireless communication system is provided. In accordance with the method, a chat session is requested using a unicast packet between a requesting wireless communication device and the controlling computer. Then, a unicast wake-up packet with an assigned multicast internet protocol address is transmitted to each wireless communication device associated with the chat group. Then, the chat session is implemented between the wireless communication devices using multicast packets over the assigned multicast internet protocol address. Finally, the chat session is released by a particular wireless communication device associated with the chat session using a unicast packet to the controlling computer.

BRIEF DESCRIPTION OF THE DRAWINGS

FIG. 4 is a diagram illustrating an example of initiation a chat room session in accordance with the invention implemented using the wireless communications system described above;

FIG. 5 is a diagram illustrating an example of management of the handoff between the various talkers in a chat room session in accordance with the invention implemented using the wireless communications system described above; and FIG. 6 is a diagram illustrating an example of termination of a chat room session in accordance with the invention implemented using the wireless communications system described above.

DETAILED DESCRIPTION OF A PREFERRED EMBODIMENT

The invention is particularly applicable to a voice-controlled wireless communications system that uses wireless access points based on an IEEE 802.11 protocol and an Ethernet wired computer network to provide the network infrastructure for the communications system. It is in this context that the invention will be described. It will be appreciated, however, that the voice-controlled wireless communications system in accordance with the invention has greater utility, since it can be implemented using various different communication protocols and various different computer networks so that it may be applicable to other communications systems where it is desirable to be able to provide a chat capability.

Figure 1:
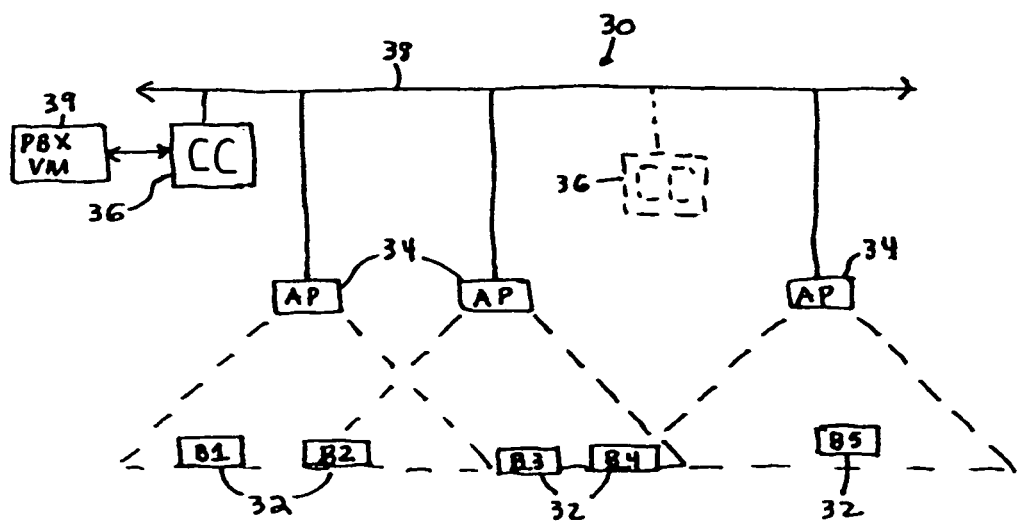
FIG. 1 depicts an example of a preferred embodiment of the voice-controlled wireless communications system in accordance with the invention.

FIG. 1 illustrates an example of a preferred embodiment of the voice-controlled wireless communications system 30 in accordance with the invention. In particular, the system comprises a plurality of wireless communication devices referred to as badges 32 (marked B1–B5 in this example), one or more wireless access points 34 (marked AP) and one or more central computers referred to as controlling computers 36 (marked CC), as shown. The access points 34 in FIG. 1 may be standard off-the-shelf wireless access points, such as a standard 802.11 access point in a preferred embodiment, which collectively implement a wireless network allowing the badges 32 to communicate with other components of the communications system 30. The access points 34 communicate with each other, and with the controlling computer 36, over a computer network 38 which may be a local area Ethernet network in a preferred embodiment. Taken together, the access points 34 and the computer network 38 provide the network infrastructure for the wireless communications system 30. Any of the controlling computers 36 may also be interfaced to a telephone system such as a Private Branch Exchange (PBX) system 39, which allows the wireless communications system 30 to communicate with common telephone communication systems.

Figure 2A:
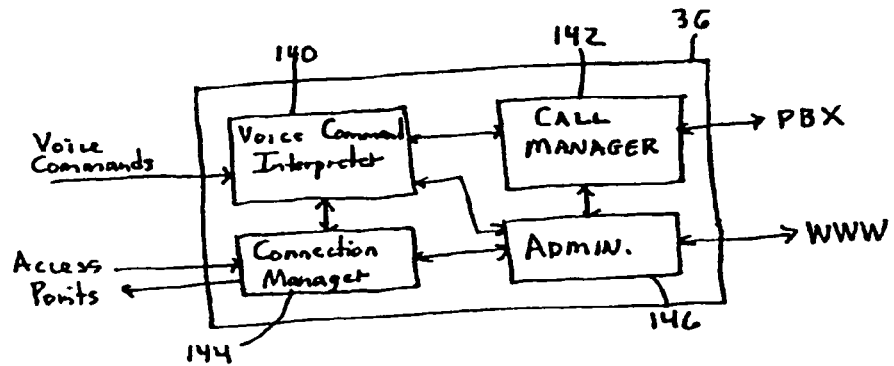
FIG. 2A depicts details of the controlling computer (CC) shown in FIG. 1.

In a preferred embodiment, the controlling computer 36 in FIG. 1 may be a typical off-the-shelf computer system, such as a typical server computer, the hardware details of which are well known. The controlling computer may additionally have hardware and software that permits the controlling computer to interface to a telephone and/or PBX system, such as a telephone interface, and a computer network interface that permits the controlling computer to connect to the computer network. The controlling computer may also include a database for storing data associated with the wireless communication system and may have an associated web server that permits web-based access to the controlling computer for configuration and administration of the system. The controlling computer 36 is responsible for the overall control of the communications system, and its functionality is implemented in a set of Java and C++ software application programs running under an operating system, such as a Windows-based operating system in a preferred embodiment. FIG. 2A illustrates more details of the controlling computer 36. In particular, the functional blocks of the Java and C++ software application programs are shown in more detail. The software may include a voice command interpreter 140, a call manager 142, a connection manager 144 and an administrator 146. The voice command interpreter 140 may be a component that includes a software-based speech engine, such as the commercially available Nuance speech engine, is built onto the speech engine and has responsibility for interpreting and executing voice-based commands received from the badges. The call manager 142 has responsibility for the set-up and the breakdown of two-party and multi-party calls and maintaining status information associated with these calls. The connection manager 144 is the component that is responsible for managing access points and the connections between badges and access points. It is also supports hands-off from one access point to another as a badge roams about the network. The administrator module 146 supports administrator-level and user-level configuration and monitoring of the system through a web browser interface as shown.

Figure 2B:
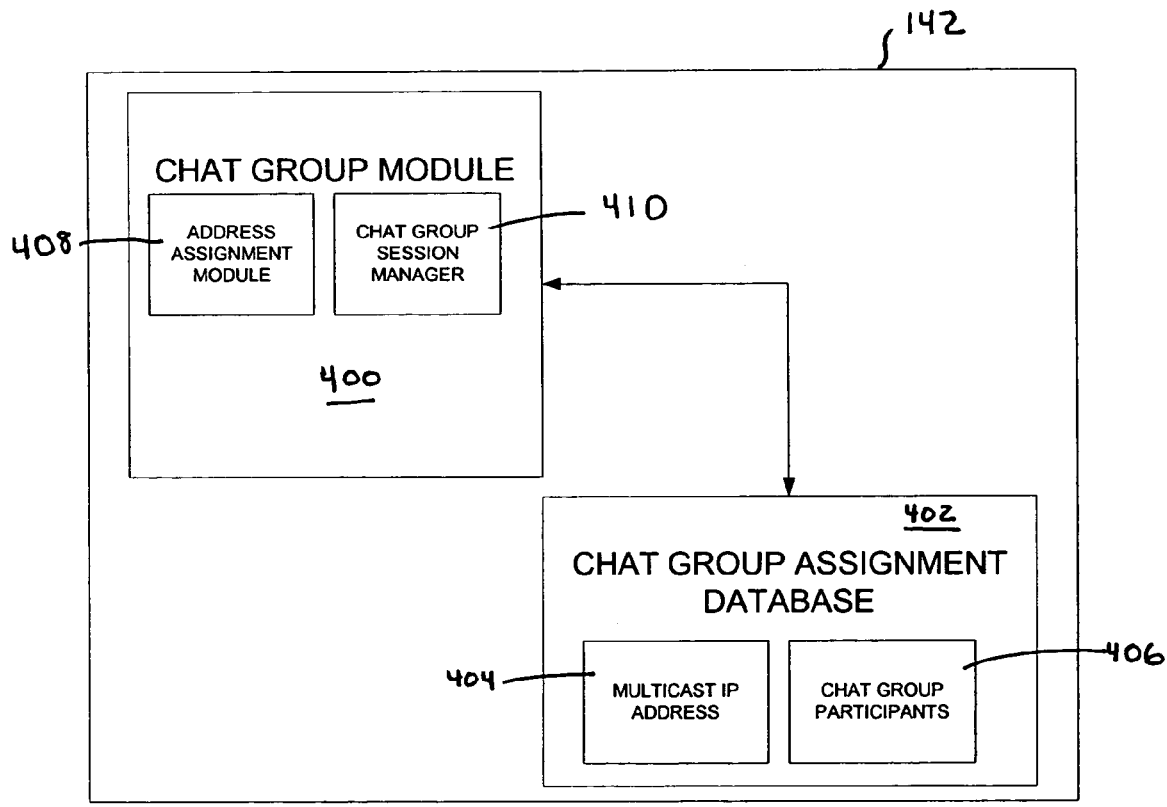
FIG. 2B illustrates more details of the controlling computer incorporating a chat room system in accordance with the invention.

FIG. 2B illustrates additional software components which may be added to the controlling computer's call manager software 142 to implement the chat feature in accordance with the invention. The chat-related controlling computer software may include a chat group module 400 and a chat group assignment database 402. In a preferred embodiment, the chat group module 400 may be one or more pieces of software that implement the chat group functionality as described below. As is well known, the one or more pieces of software of the chat group module may include a plurality of computer instructions. The chat group assignment database 402 may be part of a larger database used by the controlling computer in connection with other features of the wireless communication system, or may be its own database that may be stored in memory, in a database server, etc. . . as is well known. As shown, the chat group assignment database 402 may include, for each chat group, at least a multicast IP address 404 currently assigned to the particular chat group and a chat group membership list 406 that contains a list of the users of the system that are currently members of the particular chat group. In accordance with the invention, users of the system, via a voice command to the controlling computer, may add/remove themselves from the chat group participant list 406.

The chat group module 400 may include an address assignment module 408 and a chat group session manager 410 wherein each of these may preferably be one or more pieces of software comprising a plurality of computer instructions and data as is well known. The address assignment module, when it receives a request for a new chat session from a badge as described below, assigns a particular multicast IP address to the new chat session. The address assignment module may then store the assigned multicast address in the database 402 and may then communicate the assigned multicast IP address to the badges of the chat group participants. The chat group session manager 410 may control the address assignment module and may coordinate each chat group session such as generating and sending out the messages to the badges that are part of the particular chat group session. In more detail, the chat group session manager may set-up and terminate each chat session, establish and monitor a software-based timer as described below, and generate, send and receive unicast messages to set-up and terminate each chat session.

Figure 3A:
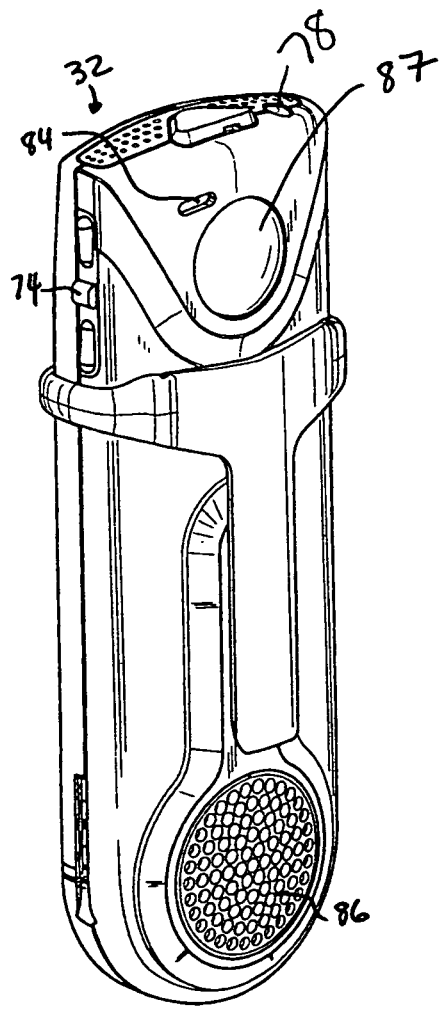
FIG. 3A depicts an embodiment of each badge (B1, B2, . . . , B5) shown in FIG. 1 in accordance with the invention.
Figure 3B:
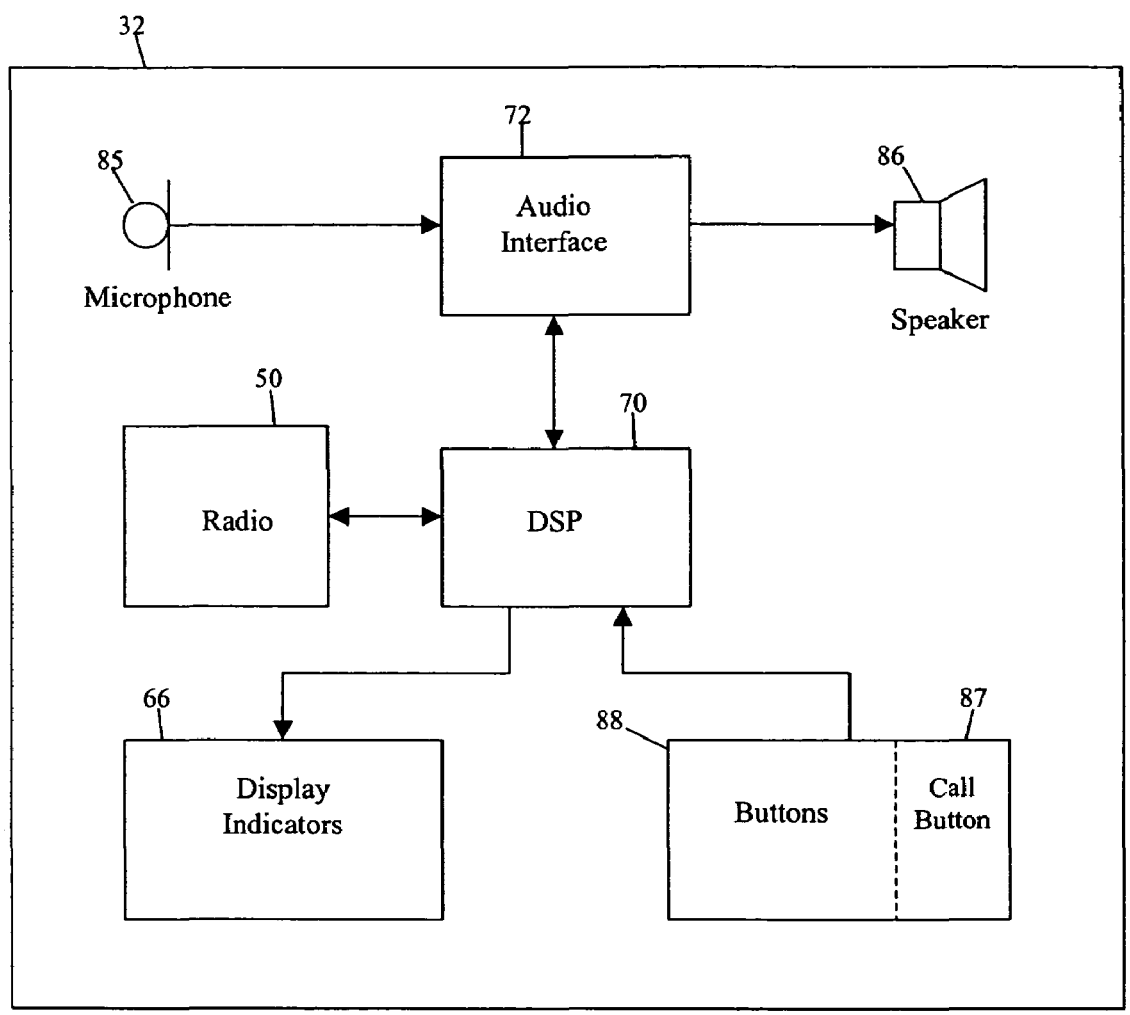
FIG. 3B depicts a block diagram illustrating the hardware components of the badge in accordance with the invention.

Each badge 32 in FIG. 1 is a wireless communications device that is capable of communicating with an access point 34, and therefore is also capable of communicating with the controlling computer 36 in order to implement the desired wireless communication functions. Each badge 32 serves as one of the primary communications endpoints of the system. FIG. 3A illustrates a preferred embodiment of the communications badge 32 in accordance with the invention, and FIG. 3B is a block diagram illustrating the hardware components of the badge 32 in accordance with the invention. In a preferred embodiment, each badge 32 is a portable, battery-powered, wireless device that supports hands-free, full duplex voice communications using a small microphone 85 (mounted behind microphone port 84) and a speaker 86. The badges are sufficiently small and lightweight enough that they may be clipped onto a shirt pocket of the user or may be worn on a lanyard around the neck of a user. Each badge 32 has a Digital Signal Processor (DSP) 70 which serves as a programmable controller of all other badge hardware. The DSP may include a processor and memory that stores the software resident on each badge. The DSP may, for example, generate a unicast packet when the call button is depressed, receive a unicast packet from the controlling computer to wake up the badge for a chat session and receive and decode the multicast packets associated with a chat session and generate the audible signals sent to the speaker during a chat session. The DSP 70 is interfaced to a radio 50 for communication with the communication system's access points. The DSP is interfaced to the microphone 85 and the speaker 86 through an audio interface 72. The DSP is also interfaced to various display indicators 66 and to various buttons 88 including a "Call Button" 87, which is generally used to initiate communications sessions. Further details on badge 32 are provided in pending U.S. patent application Ser. No. 09/947,235, which is incorporated herein by reference.

Each badge has two distinct hardware operational states which are particularly relevant to the invention. In the standby state, a badge consumes minimal power and is the state when the badge is idle. In the active state, the badge consumes full power, can be involved in active communications sessions, and will receive any packets transmitted to the badge. In the standby state, the badge consumes much less power, cannot be involved in active communications sessions, and cannot be reliably counted on to receive multicast packets. The badge can reliably receive unicast packets, and upon receipt of a unicast packet can "wake-up" and enter the active state. However, when a badge is transitioning from the standby state to the active state, a setup time exists that introduces system latency. A chat group session may involve many members speaking in turn. While each member is talking, all badges used by members of the chat group must be in the active state. For minimum power consumption, after a member is done talking, all badges used by group members would return to the standby state. If this is done, however, the setup time to transition from standby to active state would occur each time a group member pushed their call buttons to reply. This would add unacceptable system latency in the chat mode, and would defeat the desired instant communications nature of the feature. On the other hand, badges cannot remain in active mode at all times a chat message could be received, without unacceptable compromises in power consumption (and therefore battery life). To solve this problem, the invention utilizes a set of state transitions, including a timeout feature, as described below, so that badges can be in active mode whenever an incoming chat message is most likely to be received, but in standby mode otherwise. Because of this, a typical chat group session involves the standby-to-active state transition only once, minimizing system latency problems while conserving power.

Now, a method for performing a chat group communications session in accordance with the invention over a wireless communications system will be described in more detail. FIG. 4 is a diagram illustrating an example of the initiation of a chat session. In step 260, a user with a badge who wants to speak while in a chat group (in which his voice is transmitted to all other users that are part of the same chat group), may press and hold an activation button, such as the call button of the badge in the preferred embodiment of the invention. In step 262, this initiating user's badge enters the active state, and transmits a unicast packet to the controlling computer of the wireless communications system, notifying the controlling computer of the intention to initiate a chat session. In step 264, the controlling computer allocates a currently unused multicast IP address, which will be used for the chat session. In step 266, the controlling computer notifies, using a unicast packet, badges belonging to each member of the chat group other than the initiating badge that a chat session is active and wakes-up the each badge, and informs each badge of the multicast IP address which should be used for the session. This notification is done using unicast packets, so that any of the badges which are currently in the standby state will wake up and transition to the active state for the session. In step 268, each badge other than the controlling badge enters the active state if it is not already active, and listens for voice communication on the specified multicast IP address. Each badge plays any incoming voice signals over its speaker, for the user to hear. In step 270, the controlling computer uses unicast packets to notify the initiating badge that it has control of the chat session, and sends an audio chime to the controlling badge, which is played over its speaker, informing the user that he or she can begin to talk. Finally in step 272, the controlling badge begins to transmit a voice signal (from its microphone) on the specified multicast address. At this point, the chat session is underway, and the controlling user can be heard by all other members of the chat group.

The next relevant event is the handoff that must take place when the controlling user is done talking to other members of the chat group and another member wants to respond, taking control of the session. FIG. 5 is a diagram illustrating an example of a preferred method 300 for the management of this handoff. In this diagram, the initial state is the same as in step 272 of FIG. 4, with the controlling badge transmitting voice using the allocated multicast IP address. In step 310, the user with control stops talking and releases his or her call button. In step 312, the controlling badge sends a unicast packet to the controlling computer, notifying the controlling computer of the intent to release control of the chat session. In step 314, the controlling computer sends unicast packets to the controlling badge, acknowledging that control has been released, and containing an audio chime. In step 316, the controlling badge, using multicast packets, relays the audio chime to all other members of the group, where the chime is played over each badge's speaker to inform each user that they can respond. In step 318, the controlling computer starts a software timer, set to a predetermined value, which may be approximately 20 seconds in the preferred embodiment. If this software timer times out before another user attempts to respond, as described in step 320, the controlling computer proceeds to step 400 and terminates the chat session, as described in more detail in FIG. 6. In step 320, if another user or users attempt to respond by pressing and holding his or her call button, those users' badges notify the controlling computer using unicast packets. Upon receiving the first response, assuming it occurs before the software timer in step 318 has expired, the controlling computer disables the software timer in step 322, so it can no longer time out, and in step 324 uses unicast packets to notify the responding badge that it has gained control of the chat session, also sending an audio chirp to be played over that badge's speaker, informing the user that he or she may begin talking. At this point, the new controlling badge enters the same state described in step 272 of FIG. 4, transmitting a speech signal using the allocated multicast IP address. All other badges in the chat group remain in the state described in step 268 of FIG. 4, listening for voice communications on the allocated multicast address and playing any received voice over their speakers. If additional badges attempt to respond after the first responding badge has been granted control, the controlling computer uses unicast packets to send those badges an audio warning tone to be played over their speakers, informing the users that they have lost out in the contention to respond, and will not be heard by other group members if they talk.

FIG. 6 illustrates an example of termination of a chat session, which happens if the software timer described in step 318 of FIG. 5 is allowed to expire. In step 412, the controlling computer de-allocates the multicast IP address used for the chat session, allowing it to be reused for a later chat session. In step 414, the controlling computer notifies each of the badges in the chat group that the chat session has ended using a unicast packet to each badge. In step 416, each badge in the chat group returns to the standby state, to reduce power consumption and conserve battery life.

The chat room system in accordance with the invention resolves the complex tradeoffs between power consumption and system latency described above, and does so in a way that makes optimal use of multicast packets, to avoid limitations on packet processing rate in the network infrastructure of the wireless communications system. Note that in a given chat session, badges transition from standby mode to active mode only once, at the beginning of the session, before any of the chat group members begin talking. Note also that although unicast packets are used as needed for communication between the controlling computer and a single badge, communication using unicast packets which must go to each badge in the chat group only occurs at the very beginning of the session, to initiate the session, and at the end of the session, to terminate it. In these cases where unicast packets must be sent to each badge, audio signals, which require a large number of packets, are not sent. Thus, the total number of packets which must be sent over the network is kept as low as possible.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A wireless chat group system, comprising:
   a controlling computer having a processor that executes computer instructions;
   a wireless access point connected to the controlling computer;
   two or more wireless communication devices each having a processor that executes computer instructions wherein the wireless communication devices communicate with the wireless access point and wherein a first wireless communication device further comprises computer instructions that request a chat session by communicating with the controlling computer through the wireless access point; and
   wherein the controlling computer further comprises a chat group module having a chat group session manager and an address assignment module, the address assignment module further comprising computer instructions that assign a multicast internet protocol address to the chat session and the chat group session manager further comprising computer instructions that communicate a wake-up packet with the multicast internet protocol address to the wireless communications devices associated with the chat session and computer instructions that start a timer when the first wireless communication device completes its transmission over the multicast internet protocol address wherein the multicast internet protocol address for the chat session remains assigned to the chat session as long as another transmission over the multicast internet protocol address occurs before the timer times out.

2. The system of claim 1, wherein the timer computer instructions further comprises computer instructions that disable the timer each time that a wireless communication device transmits over the multicast internet protocol address and computer instructions that restart the timer each time a transmission over the multicast internet protocol address is completed whereby the chat session remains active while at least one transmission occurs over the multicast internet protocol address before the timer times out.

3. The system of claim 1, wherein the address assignment module further comprises computer instructions, when the timer times out, that revoke the multicast internet protocol address from the chat session to terminate the chat session and computer instructions that generate a unicast packet to each wireless communication device associated with the chat session to terminate the chat session wherein each wireless communication device associated with the chat session further comprises computer instructions that, in response to the termination packet, transitions the wireless communication device from an active state to a standby state.

4. The system of claim 1, wherein each wireless communication device, associated with the chat session, further comprises a computer instruction, executed by a processor of the wireless communication device, that transitions the wireless communication device from a standby state to an active state upon receipt of the wake-up packet from the controlling computer.

5. The system of claim 1, wherein the first wireless communication device further comprises a call button and wherein requesting the chat session is accomplished by depressing and holding the call button.

6. The system of claim 5, wherein the first wireless communication device further comprises computer instructions that generate a unicast packet to the controlling computer to request a chat session.

7. The system of claim 1, wherein the first wireless communication device further comprises computer instructions that release the multicast internet protocol address for the chat session when the first wireless communication device has completed transmission and wherein the controlling computer further comprises computer instructions, in response to the release of the multicast internet protocol address by the wireless communication device, that cause an audible signal to be communicated to the wireless communication devices associated with the chat group indicating that the multicast internet protocol address is available for a transmission.

8. The system of claim 7, wherein the audible signal indicating the availability of the multicast internet protocol address is communicated to the first wireless communication device via a plurality of unicast packets and the first wireless communication device further comprises computer instructions that communicate a plurality of multicast packets forwarding the audible signal to the other wireless communication devices that are part of the chat session.

9. The system of claim 8, wherein a second wireless communication device further comprises computer instructions that generates a unicast packet to the controlling computer to request control of the multicast internet protocol address after the first wireless communication device releases the multicast internet protocol address and wherein the controlling computer further comprises computer instructions that generate a chime to the second wireless communication device indicating that the second wireless communication device has control of the multicast internet protocol address and computer instructions that generate a warning tone to any other wireless communication devices that attempt to take control of the multicast internet protocol address, after the second wireless communication device has already been granted control of the multicast internet protocol address, indicating that control cannot be granted to the multicast internet protocol address.

10. The system of claim 7, wherein the first communication device further comprises a call button and wherein releasing the multicast internet protocol address is accomplished by releasing the call button.

11. The system of claim 10, wherein the first wireless communication device further comprises computer instructions that generate a unicast packet to the controlling computer to release the multicast internet protocol address.

12. The system of claim 1, wherein the timer further comprises twenty seconds.

13. A wireless chat group system, comprising:
a controlling computer;
a wireless access point connected to the controlling computer;
two or more wireless communication devices wherein the wireless communication devices communicate with the wireless access point and wherein a first wireless communication device further comprises means for requesting a chat session by communicating with the controlling computer through the wireless access point; and
wherein the controlling computer further comprises a chat group module having a chat group session means and an address assignment means, the address assignment means further comprising means for assigning a multicast internet protocol address to the chat session and the chat group session means further comprising means for communicating a wake-up packet with the multicast internet protocol address to the wireless communications devices associated with the chat session and means for starting a timer when the first wireless communication device completes its transmission over the multicast internet protocol address wherein the multicast internet protocol address for the chat session remains assigned to the chat session as long as another transmission over the multicast internet protocol address occurs before the timer times out.

14. The system of claim 13, wherein the timer means further comprises means for disabling the timer each time that a wireless communication device transmits over the multicast internet protocol address and means for restarting the timer each time a transmission over the multicast internet protocol address is completed whereby the chat session remains active while at least one transmission occurs over the multicast internet protocol address before the timer times out.

15. The system of claim 13, wherein the address assignment means further comprises means, when the timer times out, for revoking the multicast internet protocol address from the chat session to terminate the chat session and means for generating a unicast packet to each wireless communication device associated with the chat session to terminate the chat session wherein each wireless communication device associated with the chat session further comprises means for, in response to the termination packet, transitioning the wireless communication device from an active state to a standby state.

16. The system of claim 13, wherein each wireless communication device, associated with the chat session, further comprises means for transitioning the wireless communication device from a standby state to an active state upon receipt of the wake-up packet from the controlling computer.

17. The system of claim 13, wherein the first wireless communication device further comprises a call button and wherein requesting the chat session is accomplished by depressing and holding the call button.

18. The system of claim 17, wherein the first wireless communication device further comprises means for generating a unicast packet to the controlling computer to request a chat session.

19. The system of claim 13, wherein the first wireless communication device further comprises means for releasing the multicast internet protocol address for the chat session when the first wireless communication device has completed transmitting and wherein the controlling computer further comprises means, in response to the release of the multicast internet protocol address by the wireless communication device, for causing an audible signal to be communicated to the wireless communication devices associated with the chat group indicating that the multicast internet protocol address is available for a transmission.

20. The system of claim 19, wherein the audible signal indicating the availability of the multicast internet protocol address is communicated to the first wireless communication device via a plurality of unicast packets and the first wireless communication device further comprises means for communicating a plurality of multicast packets forwarding the audible signal to the other wireless communication devices that are part of the chat session.

21. The system of claim 20, wherein a second wireless communication device further comprises means for generating a unicast packet to the controlling computer to request control of the multicast internet protocol address after the first wireless communication device has released control and wherein the controlling computer further comprises means for generating a chime to the second wireless communication device indicating that the second wireless communication device has control of the multicast internet protocol address and means for generating a warning tone to any other wireless communication devices that attempt to take control of the multicast internet protocol address, after the second wireless communication device has already been granted control of the multicast internet protocol address, indicating that control cannot be granted to the multicast internet protocol address.

22. The system of claim 19, wherein the first communication device further comprises a call button and wherein releasing the multicast internet protocol address is accomplished by releasing the call button.

23. The system of claim 22, wherein the first wireless communication device further comprises means for generating a unicast packet to the controlling computer to release the multicast internet protocol address.

24. The system of claim 13, wherein the timer further comprises twenty seconds.

25. A wireless chat session method implemented using a controlling computer, a wireless access point connected to the controlling computer and two or more wireless communication devices wherein the wireless communication devices communicate with a wireless access point, the method comprising:
requesting a chat session by a first wireless communication device wirelessly connected to the controlling computer;
assigning, by the controlling computer, a multicast internet protocol address to the chat session;
communicating a wake-up packet with the multicast internet protocol address to the wireless communications devices associated with the chat session; and
starting a timer, in the controlling computer, when the first wireless communication device completes its transmission over the multicast internet protocol address wherein the multicast internet protocol address for the chat session remains assigned to the chat session as long as another transmission over the multicast internet protocol address occurs before the timer times out.

26. The method of claim 25 further comprising disabling the timer each time that a wireless communication device transmits over the multicast internet protocol address and restarting the timer each time a transmission over the multicast internet protocol address is completed whereby the chat session remains active while at least one transmission occurs over the multicast internet protocol address before the timer times out.

27. The method of claim 25, wherein the address assignment further comprises revoking, when the timer expires, the multicast internet protocol address from the chat session to terminate the chat session and generating a unicast packet to each wireless communication device associated with the chat session to terminate the chat session and transition the wireless communication device from an active state to a standby state in response to the termination unicast packet.

28. The method of claim 25 further comprising transitioning each wireless communication device associated with the chat session from a standby state to an active state upon receipt of the wake-up packet from the controlling computer.

29. The method of claim 25, wherein requesting the chat session further comprises depressing and holding a call button on a wireless communication device.

30. The method of claim 29, wherein requesting the chat session further comprises generating, at a wireless communication device, a unicast packet to the controlling computer to request a chat session.

31. The method of claim 25 further comprising releasing the multicast internet protocol address for the chat session when the first wireless communication device has completed transmitting and communicating, in response to the release of the multicast internet protocol address by the wireless communication device, an audible signal to the wireless communication devices associated with the chat group indicating that the multicast internet protocol address is available for a transmission.

32. The method of claim 31, wherein the audible signal indicating the availability of the multicast internet protocol address is communicated to the first wireless communication device via a plurality of unicast packets and further comprising communicating, via the first wireless communication device, a plurality of multicast packets forwarding the audible signal to the other wireless communication devices that are part of the chat session.

33. The method of claim 32 further comprising generating, by a second wireless communication device, a unicast packet to the controlling computer to request control of the multicast internet protocol address after the first wireless communication device releases control, generating, at the controlling computer, a chime to the second wireless communication device indicating that the second wireless communication device has control of the multicast internet protocol address and generating, at the controlling computer, a warning tone to any other wireless communication devices that attempt to take control of the multicast internet protocol address, after the second wireless communication device has already been granted control of the multicast internet protocol address, indicating that control cannot be granted to the multicast internet protocol address.

34. The method of claim 31, wherein releasing the multicast internet protocol address further comprises releasing a call button of the wireless communication device.

35. The method of claim 34, wherein releasing the multicast internet protocol address further comprises generating a unicast packet to the controlling computer to release the multicast internet protocol address.

36. The method of claim 25, wherein the timer further comprises twenty seconds.

37. A wireless chat group system, comprising:
a controlling computer having a processor that executes computer instructions;
a wireless access point connected to the controlling computer;
two or more wireless communication devices each having a processor that executes computer instructions wherein the wireless communication devices communicate with the wireless access point and wherein a first wireless communication device further comprises computer instructions to request a chat session by generating a unicast packet that is communicated to the controlling computer through the wireless access point; and
wherein the controlling computer further comprises a chat group module having a chat group session manager and an address assignment module, the address assignment module further comprising computer instructions that assign a multicast internet protocol address to the chat session and the chat group session manager further comprising computer instructions that generate a wake-up unicast packet to each wireless communications devices associated with the chat session that communicates the multicast internet protocol address wherein the chat session occurs via multicast packets sent from the first wireless communication device to the other wireless communication devices associated with the chat session.

38. The system of claim 37, wherein each wireless communication device, associated with the chat session, further comprises a computer instruction, executed by a processor of the wireless communication device, that transitions the wireless communication device from a standby state to an active state upon receipt of the wake-up packet from the controlling computer.

39. The system of claim 37, wherein the first wireless communication device further comprises a call button and wherein generating the unicast packet to request the chat session is accomplished by depressing and holding the call button.

40. The system of claim 37, wherein the first wireless communication device further comprises computer instructions that release the multicast internet protocol address for the chat session when the first wireless communication device has completed transmitting and wherein the controlling computer further comprises computer instructions, in response to the release of the multicast internet protocol address by the wireless communication device, that cause an audible signal to be communicated to the wireless communication devices associated with the chat group indicating that the multicast internet protocol address is available for a transmission.

41. The system of claim 40, wherein the audible signal indicating the availability of the multicast internet protocol address is communicated to the first wireless communication device via a plurality of unicast packets and the first wireless communication device further comprises computer instructions that communicate a plurality of multicast packets forwarding the audible signal to the other wireless communication devices that are part of the chat session.

42. The system of claim 41, wherein a second wireless communication device further comprises computer instructions that generates a unicast packet to the controlling computer to request control of the multicast internet protocol address after the first wireless communication device releases control and wherein the controlling computer further comprises computer instructions that generate a chime to the second wireless communication device indicating that the second wireless communication device has control of the multicast internet protocol address and computer instructions that generate a warning tone to any other wireless communication devices that attempt to take control of the multicast internet protocol address, after the second wireless communication device has already been granted control of the multicast internet protocol address, indicating that control cannot be granted to the multicast internet protocol address.

43. The system of claim 40, wherein the first communication device further comprises a call button and wherein releasing the multicast internet protocol address is accomplished by releasing the call button.

44. A wireless chat group system, comprising:
a controlling computer;
a wireless access point connected to the controlling computer;
two or more wireless communication devices wherein the wireless communication devices communicate with the wireless access point and wherein a first wireless communication device further comprising means for generating a unicast packet to request a chat session that is communicated to the controlling computer through the wireless access point; and
wherein the controlling computer further comprises a chat group module having a chat group session means and an address assignment means, the address assignment means further comprising means for assigning a multicast internet protocol address to the chat session and the chat group session means further comprising means for generating a wake-up unicast packet to each wireless communications devices associated with the chat session that communicates the multicast internet protocol address wherein the chat session occurs via multicast packets sent from the first wireless communication device to the other wireless communication devices associated with the chat session.

45. The system of claim 44, wherein each wireless communication device, associated with the chat session, further comprises means for transitioning the wireless communication device from a standby state to an active state upon receipt of the wake-up packet from the controlling computer.

46. The system of claim 44, wherein the first wireless communication device further comprises a call button and wherein generating the unicast packet to request the chat session is accomplished by depressing and holding the call button.

47. The system of claim 44, wherein the first wireless communication device further comprises means for releasing the multicast internet protocol address for the chat session when the first wireless communication device has completed transmitting and wherein the controlling computer further comprises means, in response to the release of the multicast internet protocol address by the wireless communication device, for causing an audible signal to be communicated to the wireless communication devices associated with the chat group indicating that the multicast internet protocol address is available for a transmission.

48. The system of claim 47, wherein the audible signal indicating the availability of the multicast internet protocol address is communicated to the first wireless communication device via a plurality of unicast packets and the first wireless communication device further comprises means for communicating a plurality of multicast packets forwarding the audible signal to the other wireless communication devices that are part of the chat session.

49. The system of claim 48, wherein a second wireless communication device further comprises means for generating a unicast packet to the controlling computer to request control of the multicast internet protocol address after the first wireless communication device releases control and wherein the controlling computer further comprises means for generating a chime to the second wireless communication device indicating that the second wireless communication device has control of the multicast internet protocol address and means for generating a warning tone to any other wireless communication devices that attempt to take control of the multicast internet protocol address, after the second wireless communication device has already been granted control of the multicast internet protocol address, indicating that control cannot be granted to the multicast internet protocol address.

50. The system of claim 47, wherein the first communication device further comprises a call button and wherein releasing the multicast internet protocol address is accomplished by releasing the call button.

51. A wireless chat session method implemented using a controlling computer, a wireless access point connected to the controlling computer and two or more wireless communication devices wherein the wireless communication devices communicate with the wireless access point, the method comprising:
generating a unicast packet requesting a chat session by a first wireless communication device that is wirelessly communicated to the controlling computer;
assigning, by the controlling computer, a multicast internet protocol address to the chat session; and
communicating, using a wake-up unicast packet to each wireless communication device associated with the chat session, the multicast internet protocol address for the chat session to each wireless communications devices associated with the chat session wherein the chat session occurs via multicast packets sent from the first wireless communication device to the other wireless communication devices associated with the chat session.

52. The method of claim 51 further comprising each wireless communications device associated with the chat session, transitioning each wireless communication device associated with the chat session from a standby state to an active state upon receipt of the wake-up packet from the controlling computer.

53. The method of claim 51, wherein generating the unicast packet to request the chat session further comprises depressing and holding a call button on the first wireless communication device to generate the unicast packet.

54. The method of claim 51 further comprising generating a unicast packet at the first wireless communication device to release the multicast internet protocol address for the chat session when the first wireless communication device has completed transmitting and communicating, in response to the release of the multicast internet protocol address by the wireless communication device, an audible signal to the wireless communication devices associated with the chat group indicating that the multicast internet protocol address is available for a transmission.

55. The method of claim 54, wherein generating the audible signal indicating the availability of the multicast internet protocol address is communicated to the first wireless communication device via a plurality of unicast packets and further comprising communicating, using the first wireless communication device, a plurality of multicast packets forwarding the audible signal to the other wireless communication devices that are part of the chat session.

56. The method of claim 55 further comprising generating, by a second wireless communication device, a unicast packet to the controlling computer to request control of the multicast internet protocol address after the first wireless communication device releases control, generating, at the controlling computer, a chime to the second wireless communication device indicating that the second wireless communication device has control of the multicast internet protocol address and generating, at the controlling computer, a warning tone to any other wireless communication devices that attempt to take control of the multicast internet protocol address, after the second wireless communication device has already been granted control of the multicast internet protocol address, indicating that control cannot be granted to the multicast internet protocol address.

57. The method of claim 54, wherein releasing the multicast internet protocol address further comprises releasing a call button on the first wireless communication device in order to release the multicast internet protocol address.

58. A wireless communication device that operates with a wireless chat group system having a controlling computer, a wireless access point connected to the controlling computer and two or more wireless communication devices wherein the wireless communication devices communicate with the wireless access point, the wireless communication device comprising:
a processor that executes a plurality of computer instructions, the computer instructions comprising computer instructions that generate a unicast packet communicated to a computer to request a chat session, computer instructions that receive a wake-up unicast packet from the computer containing the multicast internet protocol address assigned to the chat session in response to the request of the chat session, and computer instructions that communicate with other wireless communication devices in the chat session using multicast packets.

59. The device of claim 58, wherein each wireless communication device, associated with the chat session, further comprises a computer instruction, executed by a processor of the wireless communication device, that transitions the wireless communication device from a standby state to an active state upon receipt of the wake-up packet from the controlling computer.

60. The device of claim 58 further comprising a call button and wherein generating the unicast packet to request the chat session is accomplished by depressing and holding the call button.

61. The device of claim 58 further comprises instructions that generate a unicast packet to release the multicast internet protocol address for the chat session when the first communication device has completed transmitting and computer instructions that forward an audible signal from the controlling computer to the wireless communication devices associated with the chat session indicating that the multicast internet protocol address is available for a transmission.

62. The device of claim 61 further comprising a call button and wherein the call button is released in order to release the multicast internet protocol address.

63. A method for a chat group session over a wireless communication system having a controlling computer, a wireless access point connected to the controlling computer and two or more wireless communication devices wherein the wireless communication devices communicate with the wireless access point, the method comprising:

requesting a chat session using a unicast packet between a requesting wireless communication device and the controlling computer;

transmitting, to each wireless communication device associated with the chat group, a unicast wake-up packet with an assigned multicast internet protocol address;

implementing the chat session between the wireless communication devices using multicast packets over the assigned multicast internet protocol address; and releasing the chat session by a particular wireless communication device associated with the chat session using a unicast packet to the controlling computer.

64. The method of claim 63 further comprising terminating the chat session wherein the controlling computer generates a unicast packet to each wireless communication device associated with the chat group indicating the termination of the chat session and wherein each wireless communication device associated with the chat session transitions from an active state to a standby state in response to the termination packet from the controlling computer.

* * * * *